US011858619B2

United States Patent
Vinati et al.

(10) Patent No.: US 11,858,619 B2
(45) Date of Patent: Jan. 2, 2024

(54) ROTARY WING AIRCRAFT WITH IMPROVED PROPULSION SYSTEM

(71) Applicant: VINATI S.R.L., Nave (IT)

(72) Inventors: Felice Vinati, Nave (IT); Giacomo Vinati, Nave (IT); Matteo Vinati, Nave (IT); Mariachiara Vinati, Nave (IT); Samuele Vinati, Nave (IT)

(73) Assignee: VINATI S.R.L., Nave (IT)

( * ) Notice: Subject to any disclaimer, the term of this patent is extended or adjusted under 35 U.S.C. 154(b) by 421 days.

(21) Appl. No.: 17/287,744

(22) PCT Filed: Mar. 31, 2020

(86) PCT No.: PCT/EP2020/059019
§ 371 (c)(1),
(2) Date: Apr. 22, 2021

(87) PCT Pub. No.: WO2020/224871
PCT Pub. Date: Nov. 12, 2020

(65) Prior Publication Data
US 2021/0403150 A1    Dec. 30, 2021

(30) Foreign Application Priority Data

May 7, 2019 (IT) .......................... 102019000006604

(51) Int. Cl.
*B64C 27/18* (2006.01)
*B64C 27/00* (2006.01)
(Continued)

(52) U.S. Cl.
CPC ............ *B64C 27/18* (2013.01); *B64C 27/001* (2013.01); *B64D 27/24* (2013.01); *B64D 35/06* (2013.01); *B64C 2220/00* (2013.01)

(58) Field of Classification Search
CPC ......... B64C 27/18; B64C 27/10; B64C 27/82; B64C 2027/8209; B64C 27/16; B64C 27/14; B64D 27/24
See application file for complete search history.

(56) References Cited

U.S. PATENT DOCUMENTS 2,771,255 A  *  11/1956  Young ..................... B64C 27/16
                                                         244/49
11,130,565 B1 *  9/2021  Dong ....................... B64C 27/16
(Continued)

FOREIGN PATENT DOCUMENTS

| CN | 105899965 A | 8/2016 |
| CN | 207956057 U | 10/2018 |
| WO | 2019063169 A1 | 4/2019 |

OTHER PUBLICATIONS

Search Report and Written Opinion of PCT/EP2020/059019 dated May 26, 2020.

*Primary Examiner* — Valentina Xavier
(74) *Attorney, Agent, or Firm* — Silvia Salvadori, P.C.; Silvia Salvadori

(57) ABSTRACT

An aircraft (100) with a rotary wing (40) is equipped with a propulsion system (10). The aircraft (100) includes a rotating mast (50) that rotates the rotor wing (40). The propulsion system (10) includes a pole (20) mechanically connected to the rotating mast (50) of the aircraft (100), where at least one end of the pole (20) is equipped with a motor (30) configured to rotate the pole (20) around the axis of the rotating mast (50) in such a way that the rotation of the pole (20) can be used to rotate the rotating wing (40). At each end of the pole (20) is placed a motor group (30), where each motor group (30) includes a pair of counter-rotating propellers (32,32), said pair of counter-rotating propellers (32,32') being arranged in such a way as to generate a rotational torque to rotate the pole (20).

11 Claims, 2 Drawing Sheets

(51) Int. Cl.
*B64D 27/24* (2006.01)
*B64D 35/06* (2006.01)

(56) References Cited

U.S. PATENT DOCUMENTS

2017/0274981 A1 9/2017 Shiosaki et al.
2020/0094951 A1* 3/2020 Vinati .................... B64C 27/14

* cited by examiner

ROTARY WING AIRCRAFT WITH IMPROVED PROPULSION SYSTEM

This application is a U.S. national stage of PCT/EP2020/059019 filed on 31 Mar. 2020, which claims priority to and the benefit of Italian Application No. 102019000006604 filed on 7 May 2019, the contents of which are incorporated herein by reference in their entireties.

FIELD OF INVENTION

The present invention concerns a rotary wing aircraft equipped with an improved propulsion system. The same apparatus can also be used in fields other than aeronautics, particularly in the field of energy generation.

TECHNOLOGICAL BACKGROUND OF THE INVENTION

Various propulsion systems are known for rotary wing aircraft, such as helicopters.

In particular, propulsion systems applied to the ends of the rotor wing blades have already been tested, but these systems showed problems of interference with the collective cyclic apparatus of the means to which they were applied.

Known propulsion systems of this type include primarily the so-called cold jet or tip jet system.

Developed by French technicians, the apparatus included a turbine installed solely for the purpose of producing high-pressure air to be conveyed through the mast, namely the shaft of the rotating wing, and then with a complex system, through the helicopter blade to the end of the same where there was a nozzle from which air came out, thus setting the blades in motion and allowing flight.

The cold jet system was abandoned because the jet of air coming out at the ends of the blades produced considerable problems when the pitch of the blade was acted upon, namely when the blade varied angle to create lift. At that time, the propulsion jet pushed the blades upwards.

Imagine then when the cyclic control was activated with which the blade continuously changes its pitch and then the jet produced an oscillating thrust as a function of the inclination of the cyclic pitch.

Also, this jet prevented almost totally the tilt of the blade (movement along the vertical axis of the mast) being always "pushing" and never free to tilt.

This is true of the flapping movement, which was influenced by the thrust jets.

This project dates back to the early '50s and has been abandoned. There was no benefit in terms of vehicle weight, flight duration, payload.

The only advantage was the absence of the main rotor, of the tail rotor and of the freewheel, this in view of the fact that the mast was free and there were no torque problems when transmitting the motion.

Another system that has been tried and tested in the past is the so-called hot jet system.

This system included ramjets installed at the end of the helicopter blades.

The hot jet system, although simpler than the cold jet, produces the same problems because since the ramjets are placed at the ends of the blades it produces significant drawbacks mentioned above: alteration of the blade pitch, cyclic, tilting and flapping.

To these problems it must be added the problem of consumption, which makes it absolutely impossible to fly for more than 20-30 minutes with very high consumption.

All the other existing propulsion systems are connected directly to the mast via the rotor—crown/sprocket, thus having to provide a required power significantly higher than the invention An additional propulsion system for rotary wing aircraft that overcomes the above mentioned problems is described in the Italian patent application 102017000108804 and in the corresponding international patent application PCT/EP2018/071196.

This propulsion system is based on the concept of using a rotating pole, also called a "power mast" which is connected to the rotating shaft of the aircraft, where the rotating shaft puts the rotating wing into rotation.

The mast shall be mechanically attachable to the rotating shaft of the aircraft, and at least one end of the mast shall be fitted with a motor configured to rotate the mast so that the rotation of the mast can be used to rotate the rotating wing.

The purpose of this invention is to improve the performance of power mast systems both in tams of efficiency and safety.

A further aim of the invention is to create a rotary wing aircraft with reduced costs compared to existing aircraft.

SUMMARY OF THE INVENTION

These and other purposes, which will be evident from reading this description, are achieved by a rotary wing aircraft equipped with a propulsion apparatus, wherein said aircraft includes a rotating mast that rotates said rotor wing, and where said propulsion system includes a pole mechanically connected to the rotating mast of the aircraft, where at least one end of the pole is equipped with a motor configured to rotate the pole around the axis of the rotating mast in such a way that the rotation of the pole can be used to rotate the rotating wing, characterized by the fact that at each end of the pole is placed a motor group, where each motor group includes a pair of counter-rotating propellers, said pair of counter-rotating propellers being arranged in such a way as to generate a rotational torque to rotate the pole.

An advantage of this embodiment is that the configuration of the counter-rotating propellers claimed allows first of all to reduce the length of the rotating pole, thus bringing the counter-rotating propellers closer to the axis of the rotating mast and thus reducing the centrifugal acceleration to which the motors are subjected. In particular, according to one embodiment of the invention, the pole is less than half the length of the rotating wing.

A second, important, advantage of the invention is given by the fact that being the counter-rotating propellers belonging to each of the pairs of motors reduces to zero the total gyroscopic moment that acts on the "power mast".

According to one embodiment of the invention, the counter-rotating propellers are not enclosed in motor gondolas.

An advantage of this embodiment is that, by avoiding motor gondolas, possible problems of structural integrity of the gondolas themselves when operating under high centrifugal forces are avoided.

The counter-rotating propellers are electrically powered.

In addition, the presence of the engine gondolas would contribute to the rotor's resistance and the aircraft's forward resistance.

According to another embodiment of the invention, profiles are applied along the pole that allow, during the rotation of the pole, to generate a counternoise that reduces the total noise produced by the aircraft in flight.

Further features of the invention can be inferred from the dependent claims.

BRIEF DESCRIPTION OF THE FIGURES

Further characteristics and advantages of the invention will be evident from the reading of the following description provided as an example and not limited to, with the help of the attached figures, in which.

DETAILED DESCRIPTION OF THE FIGURE

Figure 1:
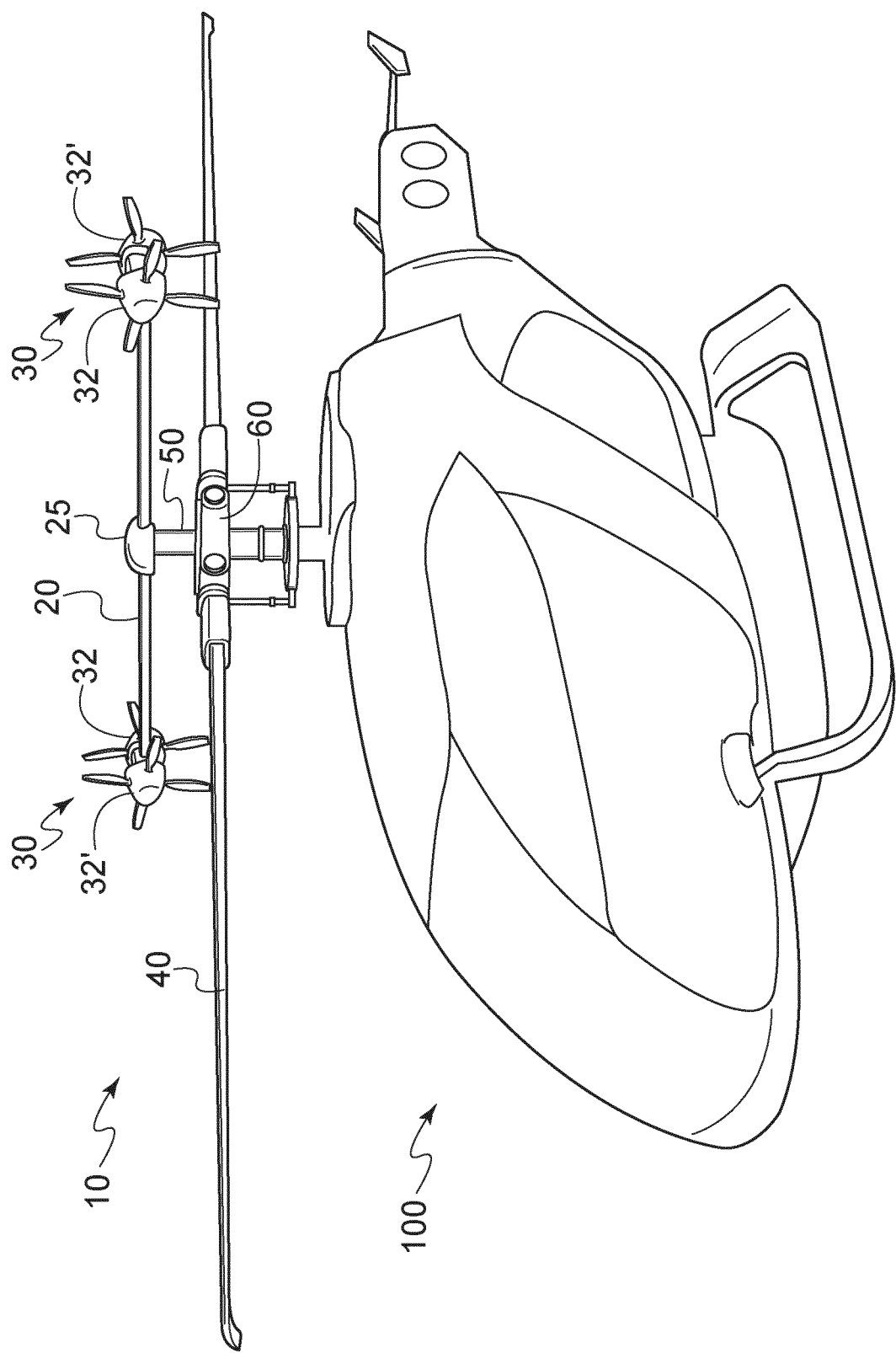
FIG. 1 schematically shows a rotary wing aircraft equipped with propulsion apparatus according to a realization of the invention.

FIG. 1 schematically illustrates an embodiment of the rotary wing aircraft 100 which is equipped with the propulsion apparatus, according to a realization of the invention, the apparatus being globally indicated with the numerical reference 10.

In general, the propulsion apparatus 10 for rotary wing aircraft of the invention is associated with a rotary shaft 50 mechanically connected to said rotary wing 40.

In general, in this description, a rotary wing aircraft is an aircraft heavier than air that uses the lift generated by particular wing surfaces, called blades, rotating around a shaft.

Propulsion apparatus 10 includes a pole 20, mechanically connectable to the rotating mast 50 of the aircraft, wherein at each end of pole 20 attached to the rotating mast 50 of the aircraft a motor 30 is applied, wherein each of the motors 30 contributes a rotating torque to rotate the pole 20 around its own axis of rotation coinciding with the axis of rotation of the rotating mast 50 for the rotation of the rotating mast 50 of the aircraft.

The motors can be, for example, electrically powered counter-rotating propellers 32,32', also known as e-fans.

The power supply of the counterrotating propellers 32,32' can be derived from a battery pack placed on board the aircraft 100.

In particular, each of the motors 30 includes a pair of counter-rotating propellers 32,32' arranged in such a way as to generate a rotation torque to rotate the pole 20.

In the proposed system, i.e. coaxial counter-rotating propellers, the power generated by an electric motor is used to rotate two propellers arranged along the same axis, but which are made to rotate in opposite directions.

Figure 2:
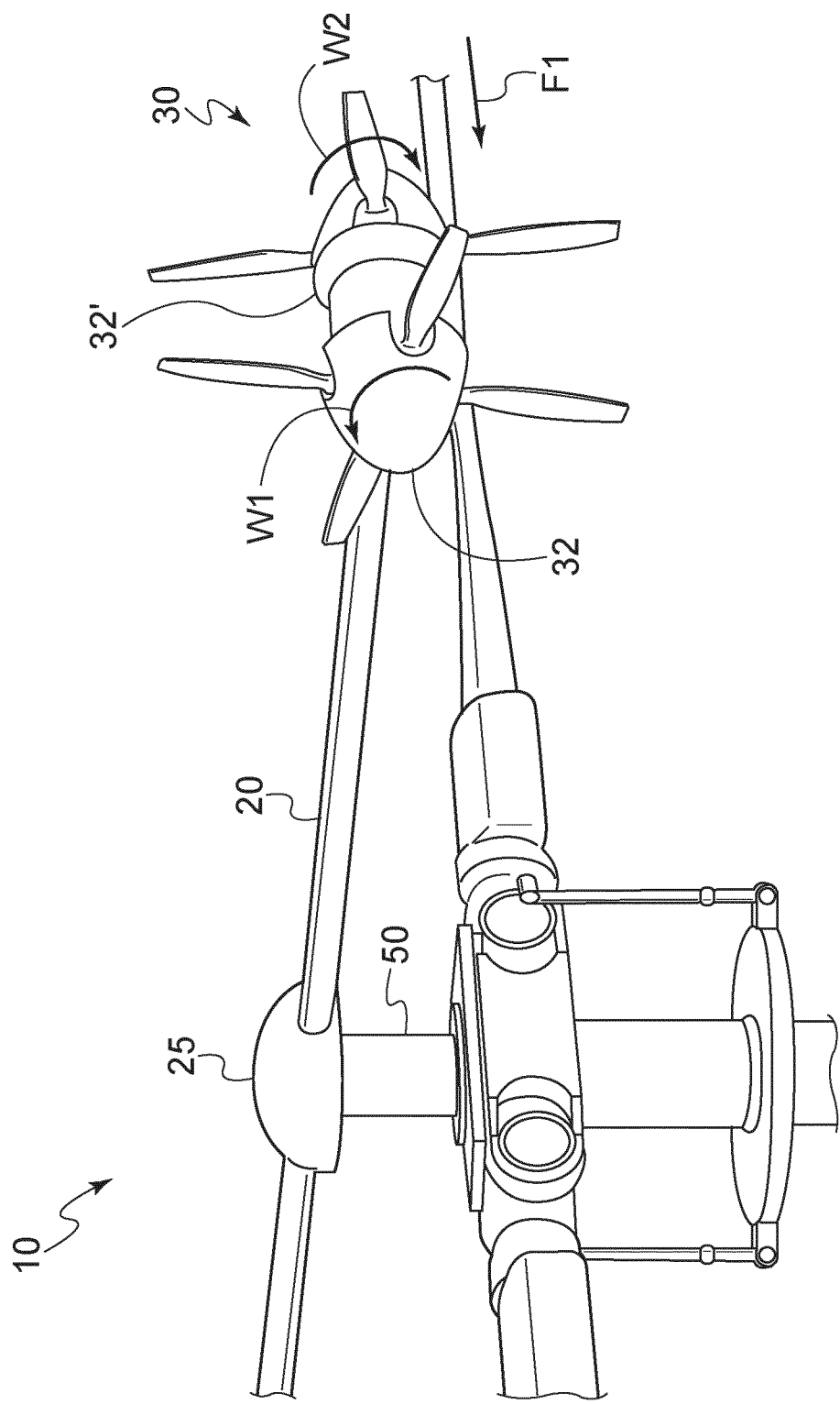
FIG. 2 schematically shows a detail of the propulsion system in FIG. 1.

In FIG. 2 it is visible a detail of the propulsion system of FIG. 1 in which figure, indicatively, the direction of rotation of the propeller 32 has been indicated with the arrow W1 and the (opposite) direction of rotation of the propeller 32' has been indicated with the arrow W2 all of which in order to generate a rotation movement of the pole 20 in the direction of the arrow F1. An advantage of this embodiment is that the configuration of the counter-rotating propellers (e-fan) claimed allows first of all to reduce the length of the rotating pole 20, thus bringing the counter-rotating propellers closer to the axis of the rotating mast 50 and thus reducing the centrifugal acceleration to which the motors are subjected.

In particular, according to one realization of the invention, the pole is less than half the length of the rotating wing 40.

Note that the centrifugal acceleration to which the electric propeller (e-fan) 30 motor units are subjected during the rotation of the pole 20 is equal to:

$$a_c = r_{eFan} \Omega^2$$

wherein $r_{eFan}$ is the distance of the motors 30 (or of their centre of gravity) from the rotation axis of pole 20 and $\Omega$ is the rotation speed of pole 20.

By bringing the electric counter-rotating propellers (e-fan) closer to the rotation axis of pole 20 and thus reducing the length of pole 20, the centrifugal forces acting on the motors and their components are proportionally reduced.

A second, important, advantage of the invention is given by the fact that since the counterrotating electric propellers (e-fan) 32,32' belong to each of the pairs of counterrotating electric propellers (e-fan) the total gyroscopic moment acting on the "power mast" is reduced to zero.

In particular, the total gyroscopic moment is given by $$M_{gyro} = I_{prop} \Omega_{eFan} \Omega$$

where $I_{prop}$ is the moment of inertia of the propeller, and $\Omega_{eFan}$ is the angular speed of the motor units 30.

Using counter-rotating propellers reduces the total gyroscopic momentum to zero.

Preferably the number of blades per propeller is 4, but a different number of blades can also be used.

According to one embodiment of the invention, the counter-rotating propellers 32,32' are not enclosed in motor gondolas.

An advantage of this embodiment is that, by avoiding motor gondolas, possible problems of structural integrity of the gondolas themselves when operating under high centrifugal forces are avoided.

In addition, the presence of the engine gondolas would contribute to the rotor's resistance and to the aircraft's forward resistance. According to an embodiment of the invention, electrical connection cables and power supply through the inside of pole 20 can also be provided.

In another variation of the invention, the pole 20 is mechanically connected directly to the rotating mast 50 of the aircraft via a rigid coupling 25.

Alternatively, the pole 20 is mechanically connected to the rotating mast 50 of the aircraft by a rigid or semi-rigid or articulated coupling.

In general, the rotation of pole 20 takes place in a different plane from the rotation of the rotating wing 40.

In particular, the point of attachment of the pole to the aircraft's rotating mast 50 may be placed above or below the aircraft steering system, e.g. above (as in the example in FIG. 1) or below the aircraft's collective plate and swashplate 60 system.

It is to be noted that the collective plate and swashplate 60 system of the aircraft is of a known type and is controlled by the pilot in a manner known in the art.

The shape of the pole 20 can be any shape with the caveat that the pole 20 should not create significant lift during its rotation. Alternatively, pole 20 can also be made with a shape that can create lift when rotated.

Preferably, pole 20 is made of carbon fiber.

The propulsion system as illustrated in FIG. 1 differs substantially from those illustrated in the introduction and known in the art.

In fact, the propulsion system 10 is not applied to the ends of the blades of the vehicle and that constitute the flight system as in the cases in the introduction.

In fact, the propulsive system object of the present invention consists of a pole 20 (also called power mast) of adequate size applied rigidly to the shaft or mast of the helicopter or other flying means having vertical take-off and is completely independent from the blades of the same.

The pole no longer has the rotor (pinion gear system) but turns freely on a suitable support (thrust bearing or other) moved by the propeller(s) at the ends.

According to an embodiment of the invention, profiles are applied along the pole 20 that allow, during the rotation of the pole 20, to generate a counternoise that reduces the total noise produced by the aircraft 100 in flight.

As an alternative or in addition to this counter-noise solution it is possible to provide a loudspeaker that generates a counter-noise as a function of the revolutions of the counter-rotating propellers, or pole 20 or other factors.

In the operation of the propulsion system 10, motors 30 generate a rotation torque for the rotating pole 20 and, by means of the connection to the rotating mast 50, generate a corresponding rotation of the rotating wing 40.

The propulsive apparatus can also be used as a torque multiplier system as it can be powered with a lower energy to be used, even in non aeronautical applications, i.e. for all those applications that can benefit from the leverage effect generated by the pole 20 (example: battery recharging, energy production from electric or endothermic rotary motion to the electric one, etc . . . ).

In essence, the invention also involves the use of a propulsion apparatus 10 associated with a rotating mast 50 where the propulsion apparatus 10 includes a pole 20 mechanically connectable to the rotating mast 50, where at least one end of pole 20 is fitted with a motor 30 configured to rotate the pole 20 around the axis of the rotating mast 50, characterized by the fact that at each end of pole 20 there is a motor unit 30, where each motor unit 30 includes a pair of electric counter-rotating propellers (e-fan) 32,32' so as to generate a rotation torque to put pole 20 into rotation and consequently put the rotating mast 50 into rotation to generate or transmit energy to a user.

Obviously, the invention as described may be modified or improved for contingent or particular reasons, without departing from the scope of the invention as claimed below.

The invention claimed is:

1. A rotor wing (40) aircraft (100) equipped with a propulsion apparatus (10), wherein said aircraft (100) includes a rotating mast (50) that rotates said rotor wing (40), and where said propulsion system (10) includes a pole (20) mechanically connected to the rotating mast (50) of the aircraft (100), where at least one end of the pole (20) is equipped with a motor (30) configured to rotate the pole (20) around the axis of the rotating mast (50) in such a way that the rotation of the pole (20) can be used to rotate the rotating wing (40), wherein at each end of the pole (20) is placed a motor group (30), where each motor group (30) includes a pair of counter-rotating propellers (32,32'), said pair of counter-rotating propellers (32,32') being arranged in such a way as to generate a rotational torque to rotate the pole (20).

2. Aircraft (100) as in claim 1, in which the counter-rotating propellers (32,32') are electrically powered.

3. Aircraft (100) as in claim 2, where the pole (20) is internally hollow to allow the passage of electrically conductive cables for the counter-rotating propellers (32,32').

4. Aircraft (100) as in claim 1, where the counter-rotating propellers (32,32') are not enclosed in engine gondolas.

5. Aircraft (100) as in claim 1, where the length of the pole (20) is less than half of the length of the rotating wing (40).

6. Aircraft (100) as in claim 1, where the rotation of the pole (20) takes place in a different plane with respect to the rotation plane of the rotating wing (40).

7. Aircraft (100) as in claim 1, where the pole (20) is mechanically connected in direct contact with the rotating mast (50) of the aircraft (100) by a rigid joint (25).

8. Aircraft (100) as in claim 1, where the shape of the pole (20) is such that it does not create lift when rotated.

9. Aircraft (100) as in claim 1, in which profiles are applied along the pole (20) that allow, during the rotation of the pole (20), to generate a counternoise that reduces the total noise produced by the aircraft (100) in flight.

10. Aircraft (100) as in claim 1, where a loudspeaker is provided that generates a counternoise depending on the revolutions of rotation of the counter-rotating propellers, or of the pole (20) or on other factors.

11. Method to generate or transmit energy to a user with a propulsion system (10) associated with a rotating mast (50), said method comprising
generating a rotational torque to turn a pole (20); consequently
turning said rotating mast (50); and
generating or transmitting said energy to said user,
wherein the propulsion system (10) comprises said pole (20) mechanically connected to the rotating mast (50), wherein to at least one of the ends of the pole (20) is applied a motor (30) configured to rotate the pole (20) around the axis of the rotating mast (50), wherein at each end of the pole (20) is placed a motor group (30), wherein each motor group (30) comprises a pair of counter-rotating propellers (32,32'.

* * * * *